United States Patent
Desilets et al.

(10) Patent No.: US 6,281,438 B1
(45) Date of Patent: Aug. 28, 2001

(54) FLUSH MOUNT POWER RECEPTACLE WITH INTEGRAL WALL PLATE

(75) Inventors: Pierre Desilets, Pierrefonds (CA); Leonard C. Rathbun, Attleboro, MA (US); Joseph Spanedda, Foster, RI (US); Hakki M. Tansi, Woodbury, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/306,666

(22) Filed: May 5, 1999

(51) Int. Cl.$^7$ ........................................ H01H 9/02
(52) U.S. Cl. ..................... 174/53; 174/66; 220/241; 439/650
(58) Field of Search ................... 174/53, 54, 60, 174/65 R, 58, 66; 439/650, 892, 107; 220/241; D8/350

(56) References Cited

U.S. PATENT DOCUMENTS

| | | | |
|---|---|---|---|
| 4,090,769 | * | 5/1978 | Damsky .............................. 339/150 R |
| 5,396,062 | * | 3/1995 | Eisentraut et al. ................... 250/229 |
| 5,486,650 | * | 1/1996 | Yetter ...................................... 174/53 |
| 5,594,205 | * | 1/1997 | Cancellieri et al. .................... 174/53 |
| 5,651,696 | * | 7/1997 | Jennison ................................ 439/536 |
| 5,712,450 | * | 1/1998 | Chan et al. ............................. 174/66 |
| 5,753,858 | * | 5/1998 | Eder et al. .............................. 174/53 |
| 5,856,633 | * | 1/1999 | Zelkovsky .............................. 174/67 |
| 5,989,067 | * | 11/1999 | Morgan et al. ....................... 439/167 |
| 5,998,734 | * | 12/1999 | Kerestan et al. ........................ 174/53 |
| 6,010,347 | * | 1/2000 | Lee ....................................... 439/222 |

\* cited by examiner

Primary Examiner—Dean A. Reichard
Assistant Examiner—Dhiru R Patel
(74) Attorney, Agent, or Firm—Paul J. Sutton

(57) ABSTRACT

An integral wall plate and power receptacle are provided for flush mounting on an electrical box or support. In that the wall plate and receptacle are made of insulating material the grounding of the wall plate is not required. The power receptacle includes a number of chambers into which contacts are selectively placed. Identification tabs on the contacts and keyways on the walls of the chambers limit insertion of the contacts to selected chambers and orient the contacts. The wall plate provides a smooth transition from the receptacle to thinned edges which receive mounting fasteners. An insert covers the base members and retains the contacts in their respective chambers while providing a smooth finished look to the wall plate.

19 Claims, 11 Drawing Sheets

FLUSH MOUNT POWER RECEPTACLE WITH INTEGRAL WALL PLATE

BACKGROUND OF THE INVENTION

1. Field of the Invention

The invention is directed to the field of power receptacles and more particularly to a flush mount power receptacle with an integral wall plate which does not have to be grounded.

2. Description of the Prior Art

A typical prior art device includes a base member of insulating material into which electrical contacts are placed and closed by a cap of insulating material. The base member is mounted in an aperture of a metal mounting plate and riveted thereto. A metal strap extends from the rivet adjacent to the ground contact to the ground contact to ground the metal mounting plate. Slots and keyhole apertures permit the mounting plate to be mounted to an electrical box or support. The cap extends beyond the mounting plate. The extension of the cap and the difference in materials and color make the device appear unfinished.

SUMMARY OF THE INVENTION

The invention is directed to a flush mount power receptacle with integral wall plate. A base member is formed with a plurality of separate chambers extending from a first end to a second end into which are placed electrical contacts. The contacts are held in place in the chambers by retainers on the back surface of an insert coupled to the base member by locking tabs and a fastener extending through the insert into the base member. A wall plate is molded onto or otherwise attached to the base member and extends beyond it to cover an electrical box or support to which the receptacle is mounted. A recess in the wall plate adjacent the base member permits the insert to be positioned flush with the top surface of the wall plate in the central region of the wall plate. The wall plate is tapered from the central region to each of the four side edges to provide a smooth transition from the receptacle to a mounting surface. A plurality of slots and keyhole apertures permit the wall plate to be mounted to an electrical box or support. In that the wall plate is made of insulating material as is true of the body member no grounding strap is required. When the insert is in place, the wall plate provides a pleasing, finished appearance.

The electrical contacts are each provided with two identification tabs that mate with key ways in the walls of the separate chambers so that only a particular electrical contact type can be placed within each chamber and each contact admitted is properly oriented. Slots in the insert permit only the correctly shaped and oriented prongs of an electrical plug to be inserted into the electrical contacts. It is an object of this invention to provide a novel flush mount power receptacle with integral wall plate.

It is an object of this invention to provide a novel flush mount power receptacle with integral wall plate formed of insulating material which does not require grounding of the wall plate.

It is another object of this invention to provide a novel flush mount power receptacle with integral wall plate and insert which when assembled provides a smooth, unbroken surface which is aesthetically pleasing.

It is yet another object of this invention to provide a novel flush mount power receptacle with integral wall plate and base member having chambers therein each to receive only one type of electrical contact and to orient such contact with respect to said face plate.

It is still another object of this invention to provide a novel flush mount power receptacle having a base member containing a plurality of chambers, each chamber containing a particular electrical contact type and an insert having a set of apertures therein to admit the prongs of a selected electrical plug therein.

Other objects and features of the invention will be pointed out in the following description and claims and illustrated in the accompanying drawings, which disclose, by way of example, the principles of the invention, and the best modes which are presently contemplated for carrying them out.

BRIEF DESCRIPTION OF THE DRAWING

In the drawings in which similar elements are given similar reference characters.

DESCRIPTION OF THE PREFERRED EMBODIMENTS

Figure 1:
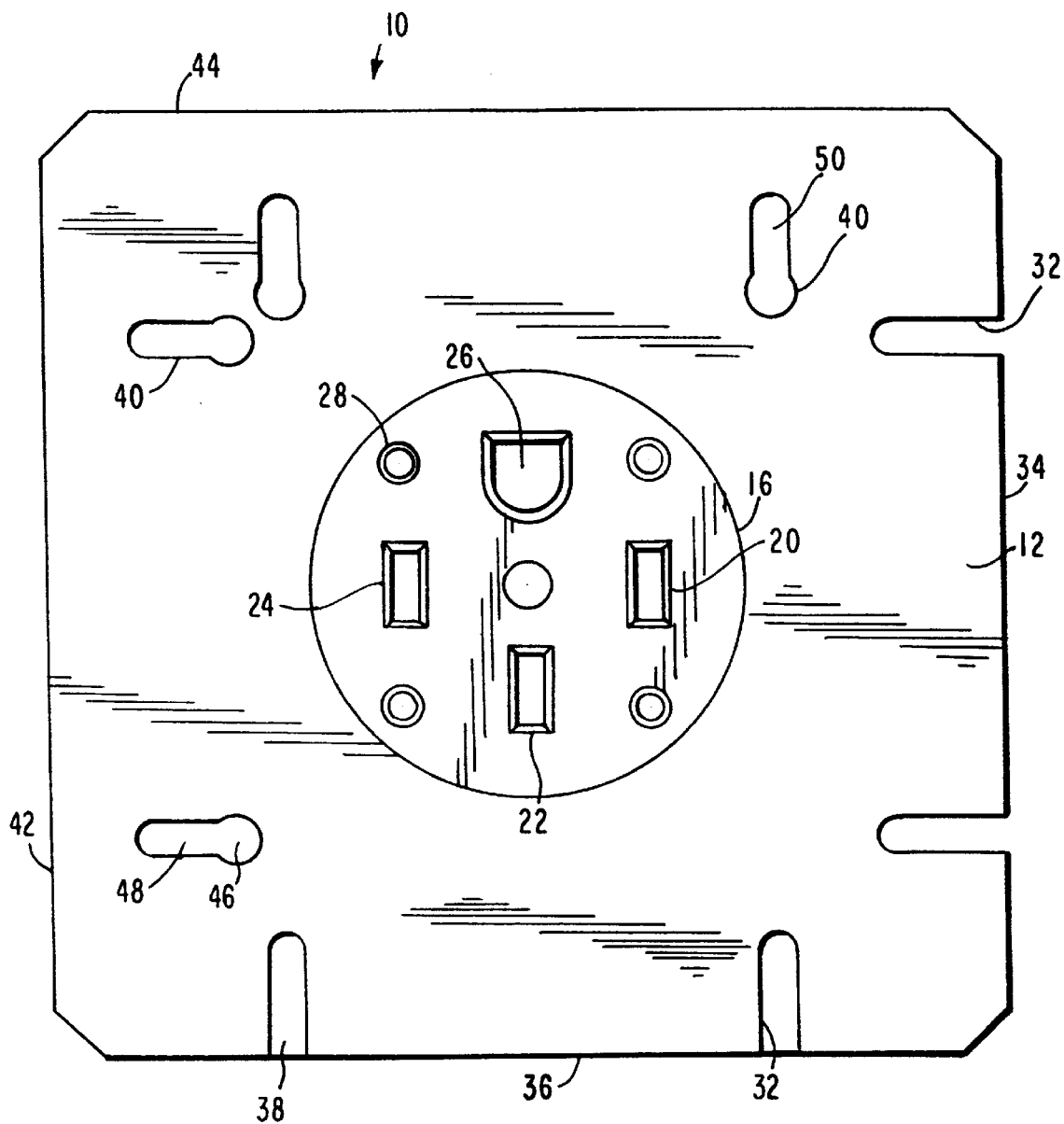
FIG. 1 is a top plan view of a power receptacle and mounting plate according to the prior art.
Figure 2:
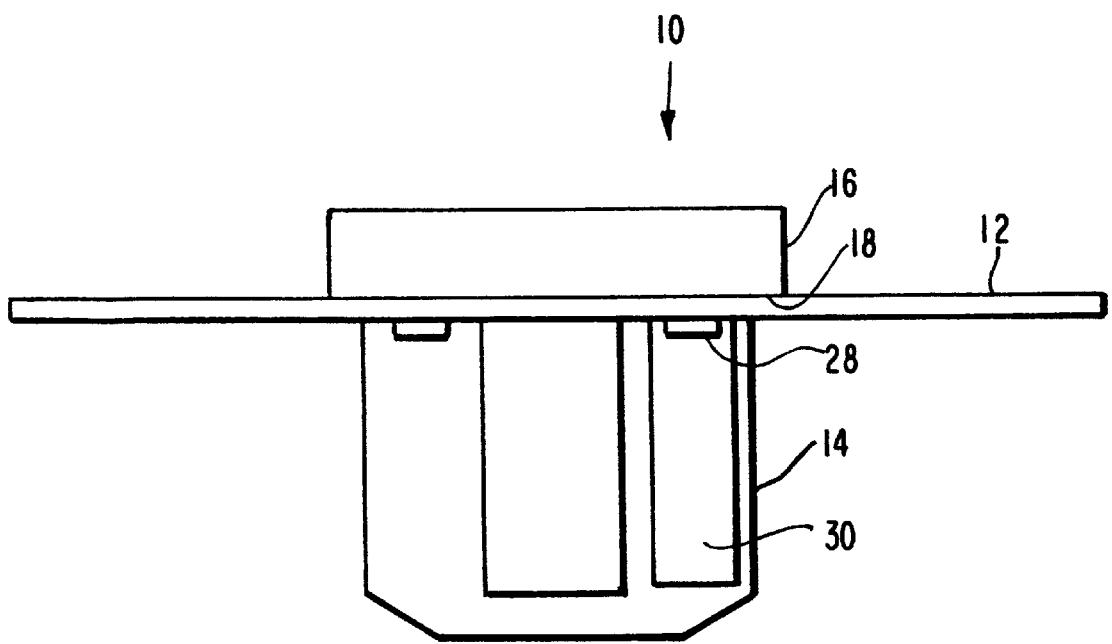
FIG. 2 is a side elevational view of the device of FIG. 1.

Turning now to FIGS. 1 and 2 a power receptacle 10 with mounting plate 12, according to the prior art is shown. Power receptacle 10 is made up of a base 14 which contains chambers (not shown) into which are placed electrical contacts (not shown). A cap 16 is coupled to the base 14 once the contacts are in place in the chambers. The diameter of cap 16 is greater than the diameter of base 14 to provide a step 18. The cap 16 is coupled to the base 14 once the contacts are in place in the chambers. The diameter of cap 16 is greater than the diameter of base 14 to provide a step 18. The cap contains slots 20, 22 and 24 and a rounded aperture 26 to receive the prongs of an electrical plug (not shown). Four rivet apertures are placed in the cap 16 to receive rivets 28 which fasten the cap 16 and base 14 to mounting plate 12. The step 18 rests on the front surface of the mounting plate 12 to position the base 14 and cap 16 with respect to the mounting plate 12. A grounding strap 30 is coupled by a rivet 28 to the mounting plate 12. The free end of the grounding strap 30 is connected to the ground contact within the base 14 (not shown) so that a grounding conductor coupled to the ground contact is also coupled to grounding strap 30 and thus the mounting plate 12 is grounded. A series of slots 32 extend inwardly from the side edges 34 and 36. The slots 32 on side edge 34 are open whereas the slots 32 on side edge 36 are closed by removable knock-outs 38. A series of keyhole apertures 40 are adjacent but spaced apart from side edges 42 and 44. Each of the keyhole apertures 40 is made up of an entry aperture 46 and a slot 48 extending therefrom and communicating with entry aperture 46. The keyhole apertures 40 alongside edge 44 are closed by removable knock-outs 50. As shown by FIG. 2, the cap 16 extends above the top surface of mounting plate 12, and this coupled with the difference in materials between the cap 16 and mounting plate 12 makes the receptacle appear unfinished.

Figure 3:
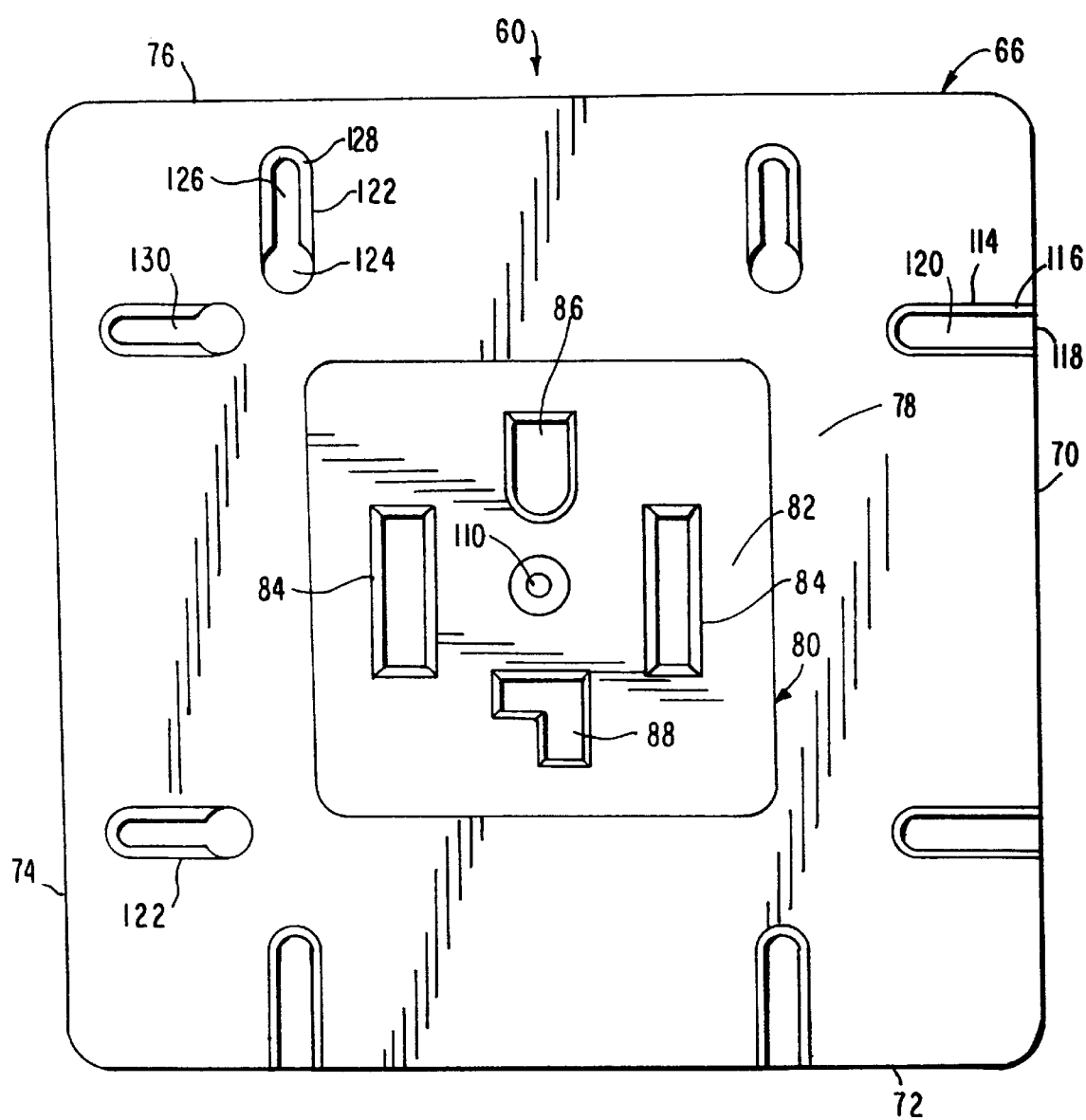
FIG. 3 is a top plan view of a flush mount power receptacle with integral wall plate constructed in accordance with the concepts of the invention.
Figure 4:
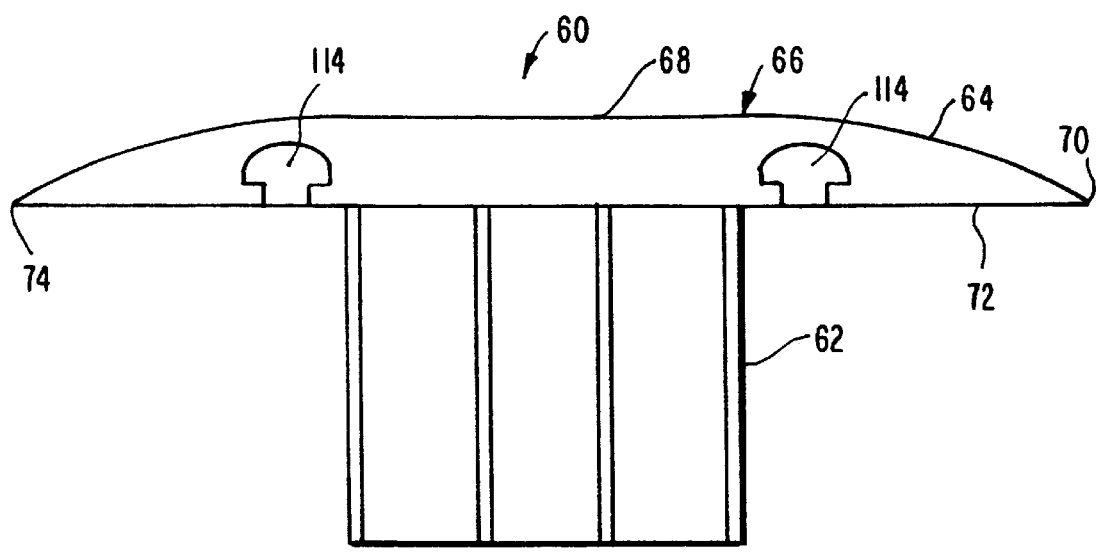
FIG. 4 is a side elevational view of the device of FIG. 3.
Figure 9:
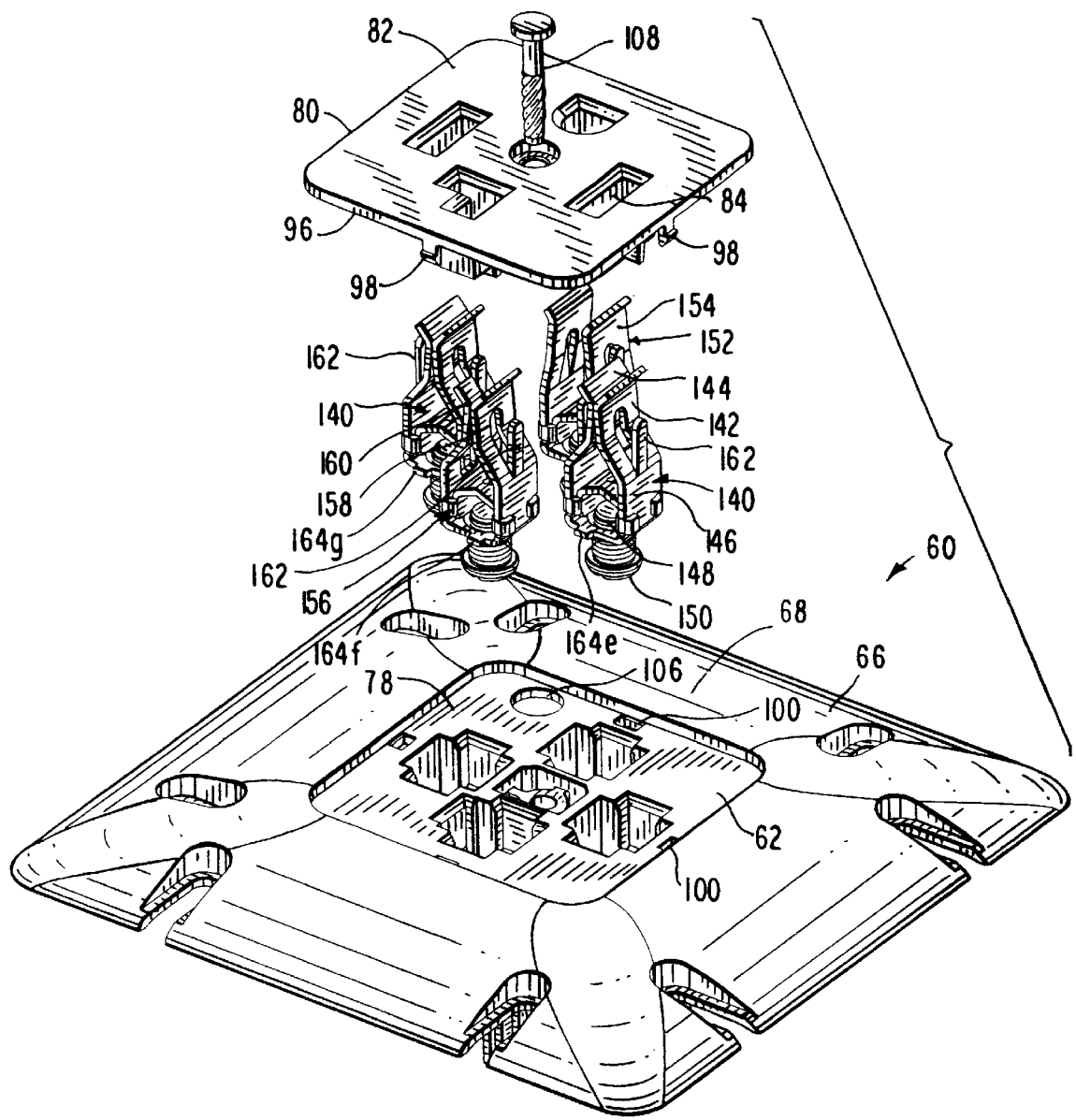
FIG. 9 is an exploded, top perspective view of the device of FIG. 3.
Figure 10:
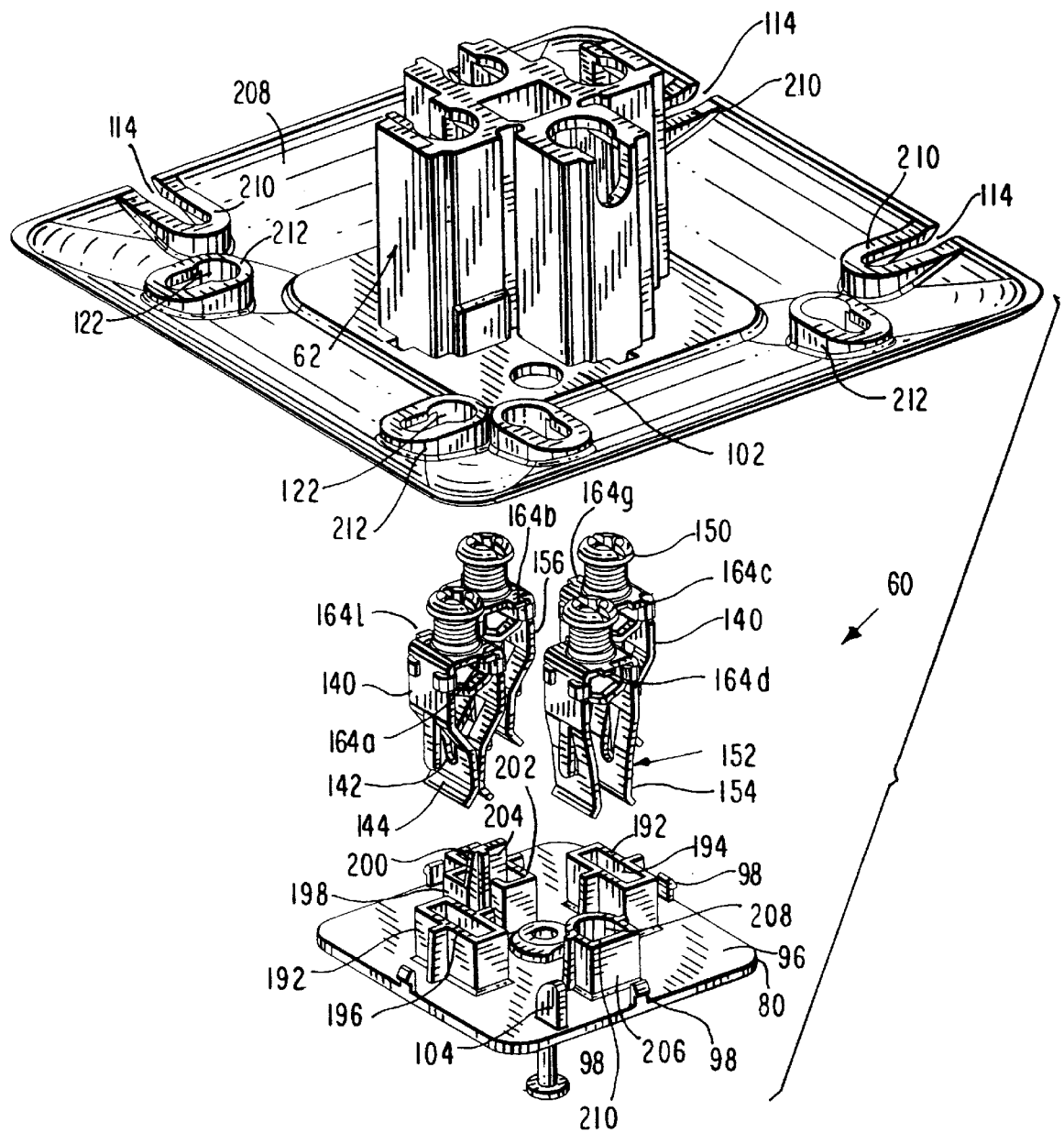
FIG. 10 is an exploded bottom, perspective view of the device of FIG. 3.
Figure 11:
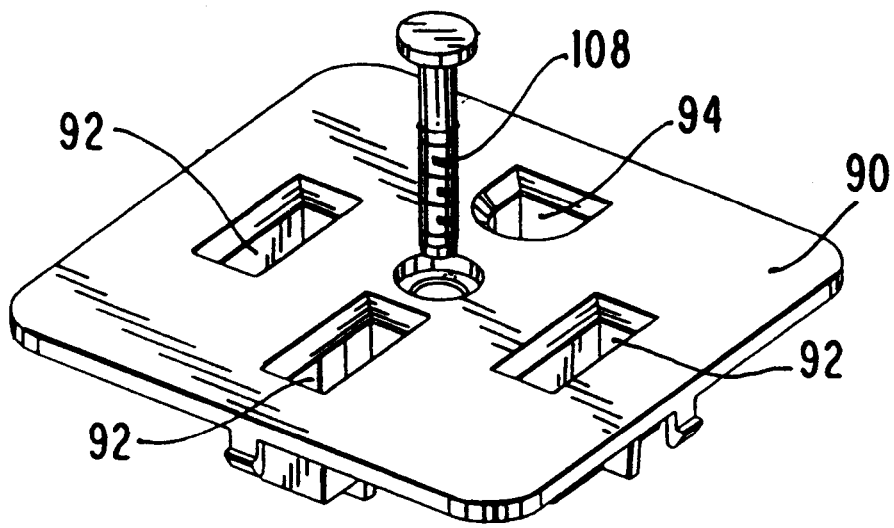
FIG. 11 is a top perspective view of a further insert, which can be used with the device of FIG. 3.

Referring now to FIGS. 3 to 10 a flush mount power receptacle 60 with integral wall plate 66 constructed in accordance with the concepts of the invention is shown. Power receptacle 60 has a base member 62 which contains a number of separate chambers 64 to receive electrical contacts therein as will be described below. Coupled to the base member 62 is a wall plate 66 having a generally flat central position 68 (see FIG. 4) and tapering smoothly to each of the four side edges 70, 72, 74 and 76. The wall plate 66 may be molded to the base member 62 or it may be attached thereto by the use of bonding agents, adhesives, sonic welding or the like. A recess 78 (see FIG. 9) in central portion 68 is arranged to receive an insert 80 so that the top flat surface 82 of insert 80 is flush with the top surface of the remainder of central portion 68. A plurality of apertures (see FIG. 3) extend through insert 80 so that the prongs of an appropriate electrical plug (not shown) can be inserted through such apertures and into engagement with the electrical contacts in chambers 64. In FIG. 3 the apertures required for a NEMA 14-30R plug and receptacle is shown. Two straight apertures 84 receive the straight prongs of a NEMA 14-30R plug, while U-shaped aperture 86 receives the generally U-shaped ground prong and the L-shaped aperture 88 receives the generally L-shaped prong. In FIG. 11 insert 90 has apertures arranged according to NEMA 14-50R. Three straight apertures 92 receive the straight prongs of the NEMA 14-50R plug (not shown) while U-shaped aperture 94 receives the generally U-shaped ground prong. The apertures through an insert can be arranged to conform to many other NEMA standard plug and receptacle combinations.

Extending from the bottom surface 96 of insert 80 are four locking tabs 98, as best shown in FIG. 9, each of which is arranged to pass through a corresponding locking aperture 100 in the floor of recess 78 and grip the rear surface of the rim 102 (see FIG. 10) about the base member 62. To initially align and orient the insert 80 with the base member 62, a fin 104 extending from the bottom surface 96 of the insert 80 (see FIG. 10) mates with an aperture 106 in the base member 62 (see FIG. 5). Unless the fin 104 is aligned with aperture 106 the insert 80 cannot be assembled to base member 62. To complete the assembly of the insert 80 to the base member 62 a self-taping screw 108 is passed through assembly aperture 110 in insert 80 and into aperture 112 in the base member 62. The assembly aperture 110 is countersunk to permit the head of screw 108 to be flush with the top surface 82 of insert 80 when the screw 108 is in its final position. The aperture 112 has a diameter less than the diameter of the self-taping screw 108 and the screw 108 cuts a thread into the walls defining aperture 112 to prevent removal of the screw 108 while holding the insert 80 and base member 62 in assembly. Because the wall plate 66 and the insert 80 are formed of insulating material such as natural or synthetic rubber, plastics or the like, there is no need to ground the wall plate 66 and the grounding strap has been omitted.

To mount the power receptacle 60 with integral wall plate 66 to an electrical box or support surface (not shown) a series of slots and keyhole apertures are placed adjacent the side edges of wall plate 66. Two elongate slots 114 are placed adjacent each of the side edges 70 and 72. Each of the slots 114 has a ridge 116 about all of the slot 114 except the entry 118. A knock-out 120 covers the slots 114 and only the slots 114 to be used have their knock-outs 120 removed. The ridges 116 are engaged by the underside of fasteners passed through slots 114. The ridges 116 permit the fastener heads to be recessed below the surface of the wall plate 66 (not shown) but securely grip the wall plate 66. Side edges 74 and 76 each have two keyhole apertures 122 adjacent but spaced from the side edges 746, 76, respectively. Each keyhole aperture 122 has an entry aperture 124 from which extends a slot 126. A ridge 128 extends about the slot 126. A knock-out 130 covers each of the keyhole apertures 122 and knock-outs 130 are removed as required. The ridges 128 serve the same purpose as ridges 116 of slots 114.

Contacts (see FIGS. 9 and 10) are placed in the Chambers 64 in accordance with their function and the plug/receptacle configuration. Contacts 140 are arranged to receive the flat straight prongs of an electrical plug. Each contact 140 is generally U-shaped having at one end two jaws 142 between which is placed a flat, straight prong of an electrical plug. The ends 144 of the jaws 142 are outwardly directed as shown in FIGS. 9 and 10 to facilitate entry of the prong between jaws 142. At the opposite end of Contact 140 is placed a screw operated conductor clamp 146. The bared end of an electrical conductor (not shown) is inserted between a bridge 148 and the end of a screw 150. As, the screw 150 is tightened it forces the bared end of the conductor against the bridge 148 thus retaining the conductor in the conductor clamp 146. Contact 152 is similar to contact 140 except the jaws 154 are initially spread apart because of the width of the ground prong of an electrical plug. The jaws 154 are outwardly deflected by the ground prong of the plug which securely grips the sides of the ground prong of the plug. Contact 156 is similar to contact 140 except that jaw 158 is as wide as jaw 142 but jaw 160 is about one half of the width of jaw 142. This permits contact 156 to grip one leg of the L-shaped prong of the plug. Each of the contacts 140 and 152 have stabilizing bars 162 on both jaws 142 and 154, respectively, and contact 156 has a stabilizing bar 162 only on jaw 158. The stabilizing bars 162 each engage a positioning rib on the side walls of the chambers 64 to support the contacts in the desired position within its respective Chamber 64.

Figure 8:
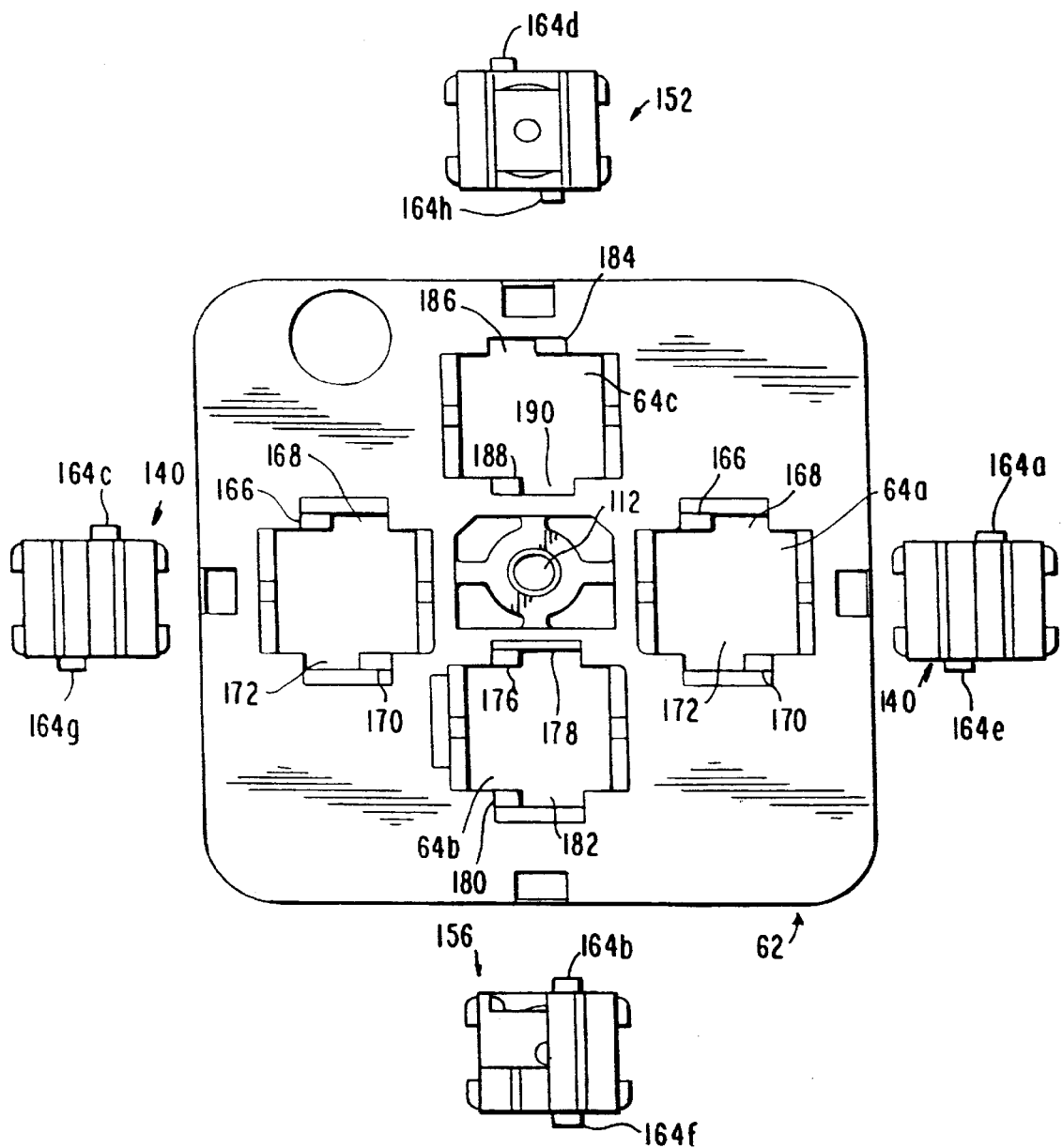
FIG. 8 is top plan view of the base member of FIG. 5 showing the keyways therein and the contacts which can be inserted into each chamber of the base member.

Each of the contacts 140, 156, 140 and 152 have two identification (ID) tabs 164 adjacent the screw operated conductor clamp 146 (see FIG. 8). ID tabs 164a, 164b, 164c and 164d extend along a top edge of the contacts 140, 156, 140 and 152 while ID tabs 164e, 164f, 164g and 164h extend along the spaced apart parallel bottom edge of the contacts 140, 156, 140 and 152. The ID tabs on each edge can take one of two possible positions as shown by ID tabs 164e and 164f, thus providing four discrete combinations. These ID tabs 164 in conjunction with keyways to be described below, are used to prevent the entry of a contact into a chamber 64 unless it matches the chamber 64 configuration and orients the jaws 142, 154, 158 and 160 correctly for the prongs of the electrical plug to be inserted.

FIGS. 5 to 8 depicts base member 62 showing the chambers 64a, 64b, 64a and 64c. Chambers 64a have a top internal rib 166 which defines a keyway 168 and a bottom internal rib 170 which defines a keyway 172. Only a contact having ID tabs 164a and 164e in the positions of keyways 168 and 172 will be permitted to enter cavity 164a and then only when the ID tabs 164a and 164e are aligned with keyways 168, 172 (see FIG. 8). Positioning ribs 174 on the side walls of the chambers 64a, 64b, 64a and 64c in conjunction with stabilizing bars 162 position the contact in its respective chambers and prevent movement of the contacts when the plug blades are inserted. Chamber 64b has a top internal rib 176 which defines a keyway 178 and a bottom internal rib 180 which defines a keyway 182. Only contact 156 has ID tabs 164b and 164f which can be aligned with keyways 178 and 182 thus permitting contact 156 to enter chamber 64b in its correct orientation. Similarly, chamber 64c has a top internal rib 184 which defines a keyway 186 and a bottom internal rib 188 which defines a keyway 190. Ground contact 152 has ID tabs 164d and 164h in positions corresponding to keyways 186, 190 and can be inserted in chamber 64c properly oriented. To retain the contacts 140, 156, 140 and 152 in their respective chambers 64a, 64b, 64a and 64c a series of retainers is used as shown in FIG. 10. The retainers have complimentary shapes to the apertures in the insert 80 and top edges which engage the free ends of the contacts to hold the contacts in the correct position. Retainers 192 are rectangular with a straight slot 194 and a top edge 196 thereabout. The free ends of contacts 140 engage edges 196 to hold contacts 140 in place and slot 194 permits flat, straight prongs to be inserted through slots 194 into contacts 140. Retainer 198 is L-shaped with an L-shaped slot 200 and a top edge 202. An additional positioning tab 204 is provided for contact 156. The ends of the jaws 158, 160 of contact 156 will engage top edge 202 of retainer 198 to hold the contact 156 in place while permitting an L-shaped prong of a suitable plug to be inserted through L-shaped slot 200 into contact 156. U-shaped retainer 206 has a U-shaped slot 208 and a top edge 210. The ends of contact 152 will engage top edge 210 to fix the position of contact 152 and the slot 208 will permit the U-shaped ground prong of a plug to enter slot 208 and be positioned between jaws 154 of contact 152.

Figure 5:
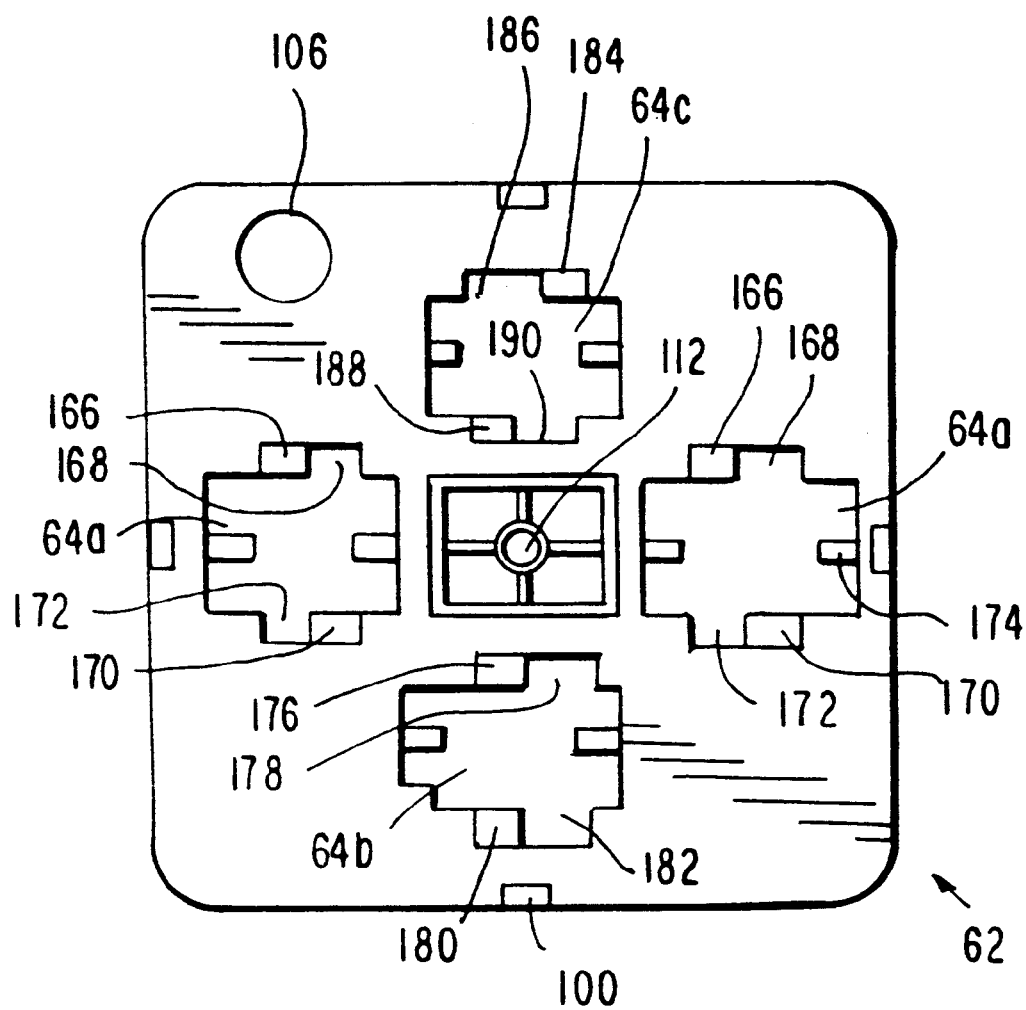
FIG. 5 is a top plan view of the base member of the device up FIG. 3 with the insert removed to show details of the internal chambers.
Figure 6:
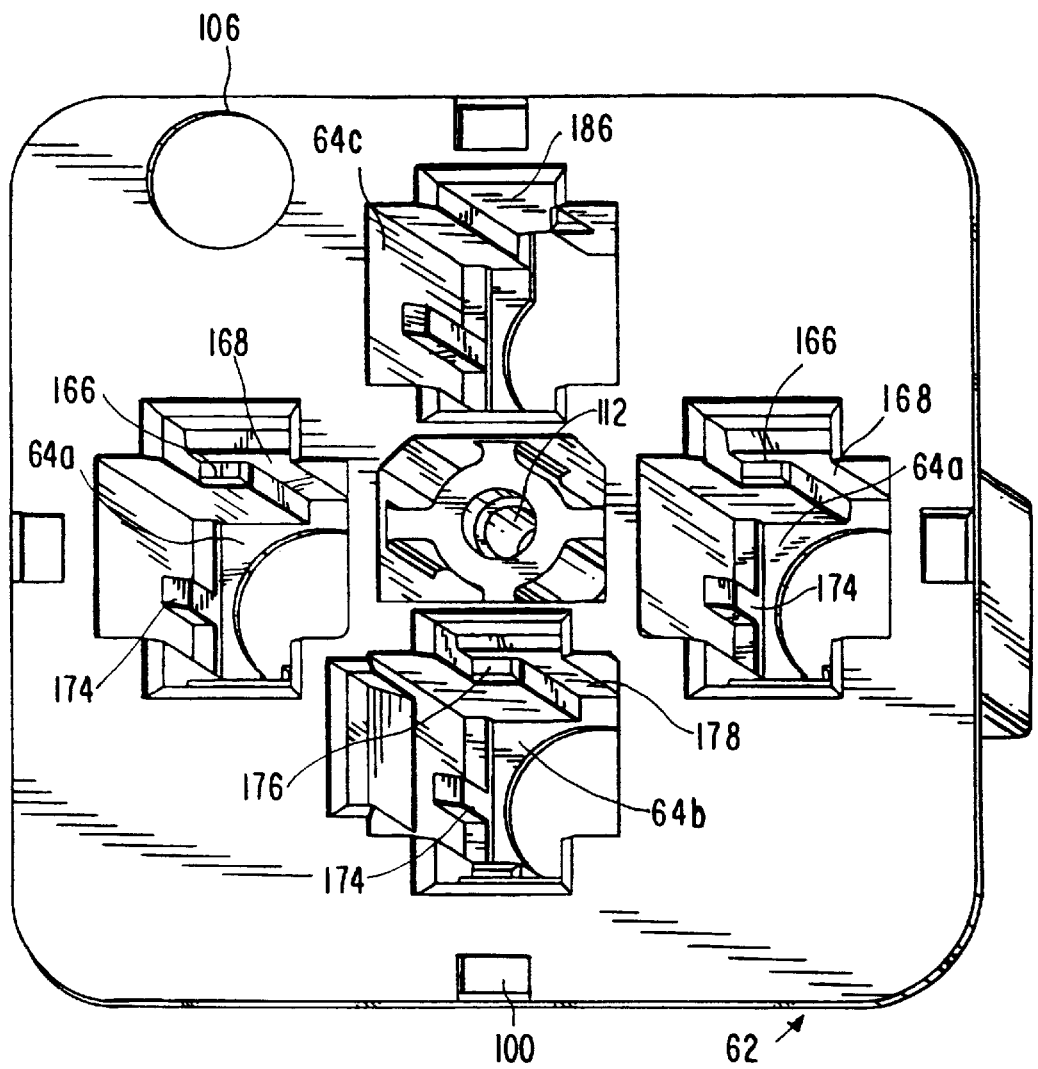
FIG. 6 is a front right perspective view of the base member of FIG. 5.
Figure 7:
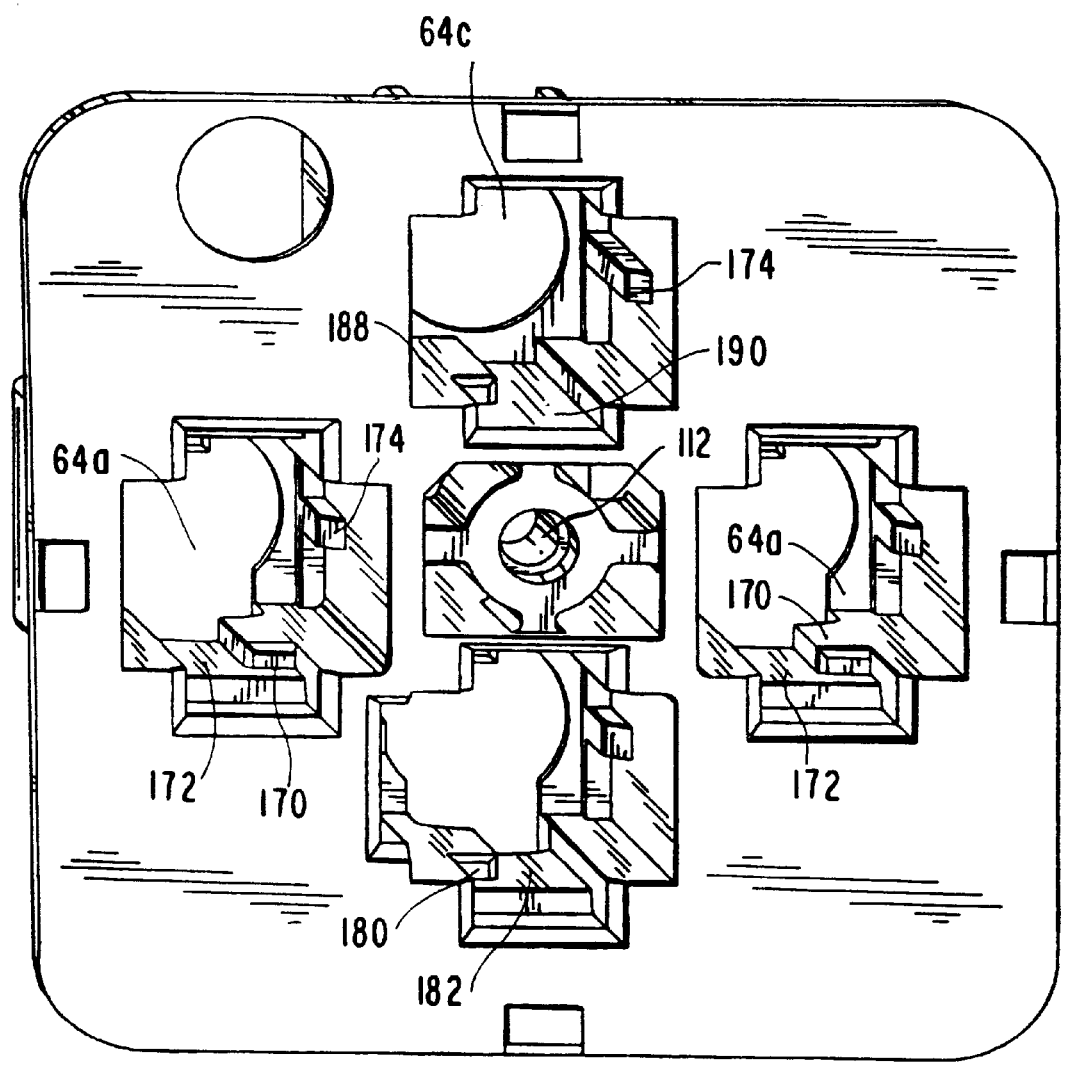
FIG. 7 is a front left perspective view of the base member of FIG. 5.

To assemble the flush mount power receptacle 60 with integral wall plate 66 the following sequence is followed. A base member 62 with a wall plate 66 attached is positioned such that the cavities 64a, 64b, 64a and 64c are oriented as shown in FIG. 5. Next the contacts 140 are placed in cavities 64a by aligning the ID tabs 164a and 164e with the keyways 168, 172. This is followed by inserting contact 156 into cavity 64b using ID tabs 164b and 164f in keyways 178, 182. The second contact 140 is arranged to put ID tabs 164c and 164g in keyways 168 and 172, respectively. Finally, contact 152 is inserted into cavity 64c with ID tabs 164d and 164h entering keyways 186, 190. This sequence of inserting the contacts into base member 62 is for illustrative purposes and the contacts 140, 156 and 152 may be inserted into base member 62 in any desired order. Once the contacts 140, 152 and 156 are in place the insert 80 is positioned over recess 78 with fin 104 of insert 80 aligned with aperture 106 in the base member 62. In such position the retainers 192, 198, 192 and 206 enter their associated cavities 64a, 64b, 64a and 64c. A downward push on the top surface 82 of insert 80 causes the locking tabs 98 to enter their respective slots 100 and engage the underside of lip 102. The assembly is completed by placing a self-taping screw 108 in aperture 110 of the insert 80 and driving it downwardly with a hammer or the like into aperture 112 of base member 62.

The interior surface 208 of the wall plate 66 has raised ledges 210 about each of the slots 114 and raised ledges 212 about each of the keyhole apertures 122 to prevent over tightening of fasteners which are inserted in slots 114 and keyhole apertures 122 and cracking of the wall plate 66.

Figure 12:
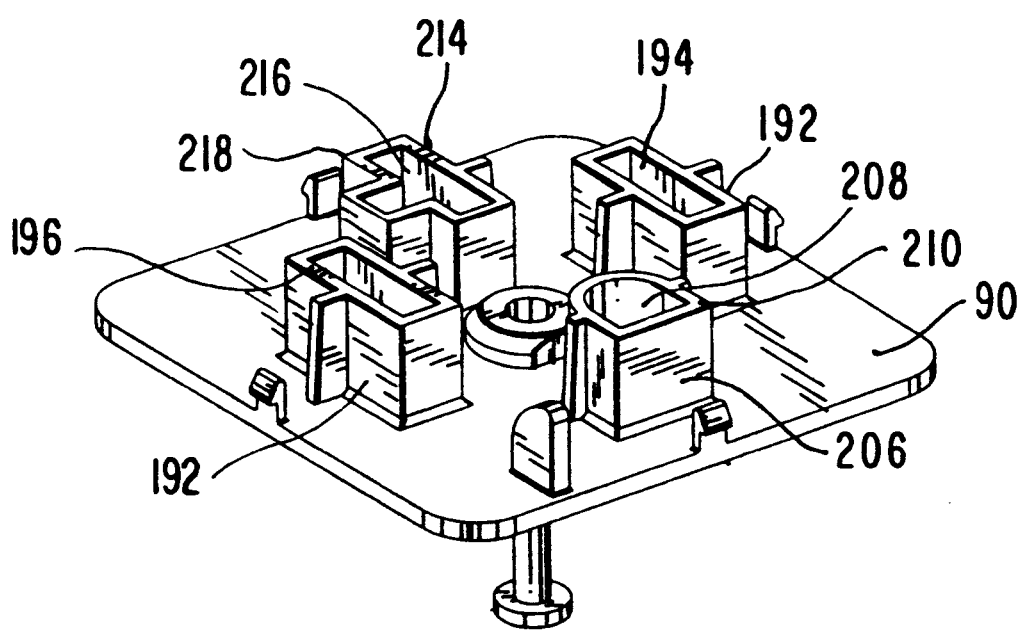
FIG. 12 is a bottom perspective view of the insert of FIG. 11.

FIGS. 11 and 12 show an insert 90 arranged to receive an electrical plug with three flat, straight prongs and a U-shaped ground prong. The third flat, straight prong replacing the L-shaped prong of FIGS. 1 to 10. The retainer 214 is generally rectangular and has a slot 216 and a top edge 218. Top edge 218 engages the free end of a contact 140. The assembly of insert 90 to a body member 62 will be the same as set forth with respect to insert 80.

While there have been shown and described and pointed out the fundamental novel features of the invention as applied to the preferred embodiments, as are presently contemplated for carrying them out, it will be understood that various omissions and substitutions and changes of the form and details of the devices illustrated and in their operation may be made by those skilled in the art, without departing from the spirit of the invention.

We claim:

1. A flush mount power receptacle comprising:
    a) a base member formed of insulating material having a plurality of separate chambers extending from a first end to a second end;
    b) a wall plate formed of insulating material and integral with said base member adjacent said first end and extending beyond said base member;
    c) said wall plate having a plurality of mounting apertures to selectively receive therethrough a fastener to flush mount said power receptacle to a supporting surface; and
    d) an insert formed of insulating material adapted to be coupled to said base member at said first end to partially close said separate chambers;
    wherein said wall plate is defined by a bottom surface and a top surface and four side edges and said top surface tapers from a central portion of said top surface to each of said four side edges.

2. A flush mount power receptacle, as defined in claim 1, wherein said wall plate has a recess adjacent said central portion and said base member to receive therein said insert so that a top surface of said insert is flush said top surface of said wall plate at said central portion.

3. A flush mount power receptacle, as defined in claim 2, further comprising:
    a) at least two apertures in said base member at said first end; and
    b) at least two locking tabs, one for each of said at least two apertures, extending from a bottom surface of said insert, each of said at least two locking tabs engaging an associated one of said at least two apertures in said base member to fasten said insert to said base member.

4. A flush mount power receptacle, as defined in claim 1, wherein said mounting apertures comprise four slots, two first slots open to a first side edge and two second slots open to a second side edge and a ridge about each of said first and second slots to receive the head of a fastener passed through one of said first and second slots.

5. A flush mount power receptacle, as defined in claim 1, wherein said mounting apertures comprise four keyhole apertures, two first keyhole apertures adjacent a first side edge and two second keyhole apertures adjacent a second side edge, each of said first and second keyhole apertures comprising an entry aperture and a slot extending from said entry aperture and a ridge about each of said first and second keyhole slots to receive the head of a fastener passed through one of said keyhole first and second slots.

6. A flush mount power receptacle, as defined in claim 1, wherein said mounting apertures comprise:
   a) four slots, two first slots open to a first side edge and two second slots open to a second side edge adjacent said first side edge and a first ridge about each of said first and second slots to receive the head of a fastener passed through one of said first and second slots; and
   b) four keyhole apertures, two first keyhole apertures adjacent a third side edge and two second keyhole apertures adjacent a fourth side edge, each of said first and second keyhole apertures comprising an entry aperture and a
   slot extending from said entry aperture and a second ridge about each of said first and second keyhole slots to receive the head of a fastener passed through one of said first and second slots.

7. A flush mount power receptacle, as defined in claim 1, further comprising:
   a plurality of electrical contacts, one for each of said separate chambers, one electrical contact in each of said separate chambers.

8. A flush mount power receptacle, as defined in claim 7, wherein each of said plurality of electrical contacts has discrete identification tabs thereon.

9. A flush mount power receptacle, as defined in claim 8, wherein the walls defining said separate chambers have keyways therein to permit entry of the identification tabs of only a single electrical contact type and serve to orient said electrical contact with respect to said base member.

10. A flush mount power receptacle, as defined in claim 8, wherein there are two identification tabs, one on each of two parallel spaced apart edges of said electrical contacts.

11. A flush mount power receptacle, as defined in claim 10, wherein each identification tab can take one of two discrete positions to provide four possible combinations.

12. A flush mount power receptacle, as defined in claim 11, wherein the walls defining said separate chambers have keyways therein to permit entry of the identification tabs of only a single electrical contact type and serve to orient said electrical contact with respect to said base member.

13. A flush mount power receptacle, as defined in claim 7 wherein said insert has a top surface and a bottom surface and a plurality of retainers, one for each of said separate chambers, extending from said bottom surface whereby when said insert is assembled to said base member said retainers each enter an associated separate chamber to retain each of said electrical contacts within said separate chambers.

14. A flush mount power receptacle, as defined in claim 7, wherein said insert has one opening adjacent each of said separate chambers to permit the insertion of a prong of an electrical plug into each of said electrical contacts.

15. A flush mount power receptacle, as defined in claim 14, wherein said openings have a shape and placement to admit only the prongs of a particular type of electrical plug.

16. A flush mount power receptacle, as defined in claim 1, wherein said base member has a central aperture and said insert has an associated central aperture whereby a fastener can be passed through said central aperture in said insert to said base member.

17. A flush mount power receptacle, as defined in claim 1, wherein said base member, said wall plate and said insert are each formed of a plastic material.

18. A flush mount power receptacle comprising:
   a) a base member formed of insulating material having a plurality of separate chambers extending from a first end to a second end;
   b) a wall plate formed of insulating material and integral with said base member adjacent said first end and extending beyond said base member;
   c) said wall plate having a plurality of mounting apertures to selectively receive therethrough a fastener to flush mount said power receptacle to a supporting surface;
   d) an insert formed of insulating material adapted to be coupled to said base member at said first end to partially close said separate chambers;
   e) a plurality of electrical contacts, each of the plurality of electrical contacts having at least one discrete identification tab thereon;
   wherein said wall plate is defined by a bottom surface and a top surface and four side edges and said top surface tapers from a central portion of said top surface to each of said four side edges.

19. A flush mount power receptacle, as defined in claim 18, wherein said base member has a central aperture and said insert has an associated central aperture whereby a fastener can be passed through said central aperture in said insert to said base member.

\* \* \* \* \*